United States Patent [19]
Fukano et al.

[11] Patent Number: 5,979,792
[45] Date of Patent: Nov. 9, 1999

[54] SUCK BACK VALVE HAVING DIAPHRAGM WITH THICK WALLED SECTION

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 08/992,905

[22] Filed: Dec. 18, 1997

[30] Foreign Application Priority Data

Jan. 9, 1997 [JP] Japan .................................. 9-002415

[51] Int. Cl.$^6$ .................................................. B05B 15/00
[52] U.S. Cl. ........................ 239/119; 239/106; 239/586; 222/571
[58] Field of Search .................................. 239/104, 106, 239/119, 583, 586; 222/571

[56] References Cited

U.S. PATENT DOCUMENTS

| | | | |
|---|---|---|---|
| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 5,134,962 | 8/1992 | Amada et al. | |
| 5,423,482 | 6/1995 | Mueller et al. | 239/119 X |

FOREIGN PATENT DOCUMENTS

| | | |
|---|---|---|
| 2 626 501 | 8/1989 | France . |
| 2-62031 | 3/1990 | Japan . |
| 8-10399 | 3/1996 | Japan . |

*Primary Examiner*—Andres Kashnikow
*Assistant Examiner*—Steven J. Ganey
*Attorney, Agent, or Firm*—Oblon, Spivak, McClelland, Maier & Neustadt, P.C.

[57] ABSTRACT

A suck back valve comprises a valve body including a fluid passage having a first port formed at one end and a second port formed at the other end, and an air supply port for introducing a pressurized fluid; a displacement mechanism provided displaceably at the inside of the valve body, for making displacement in accordance with an action of the pressurized fluid introduced from the air port; a first diaphragm coupled to the displacement mechanism, for making displacement integrally with the displacement mechanism; and a seat section provided to face to the fluid passage, for seating the first diaphragm or making separation from the first diaphragm.

10 Claims, 5 Drawing Sheets

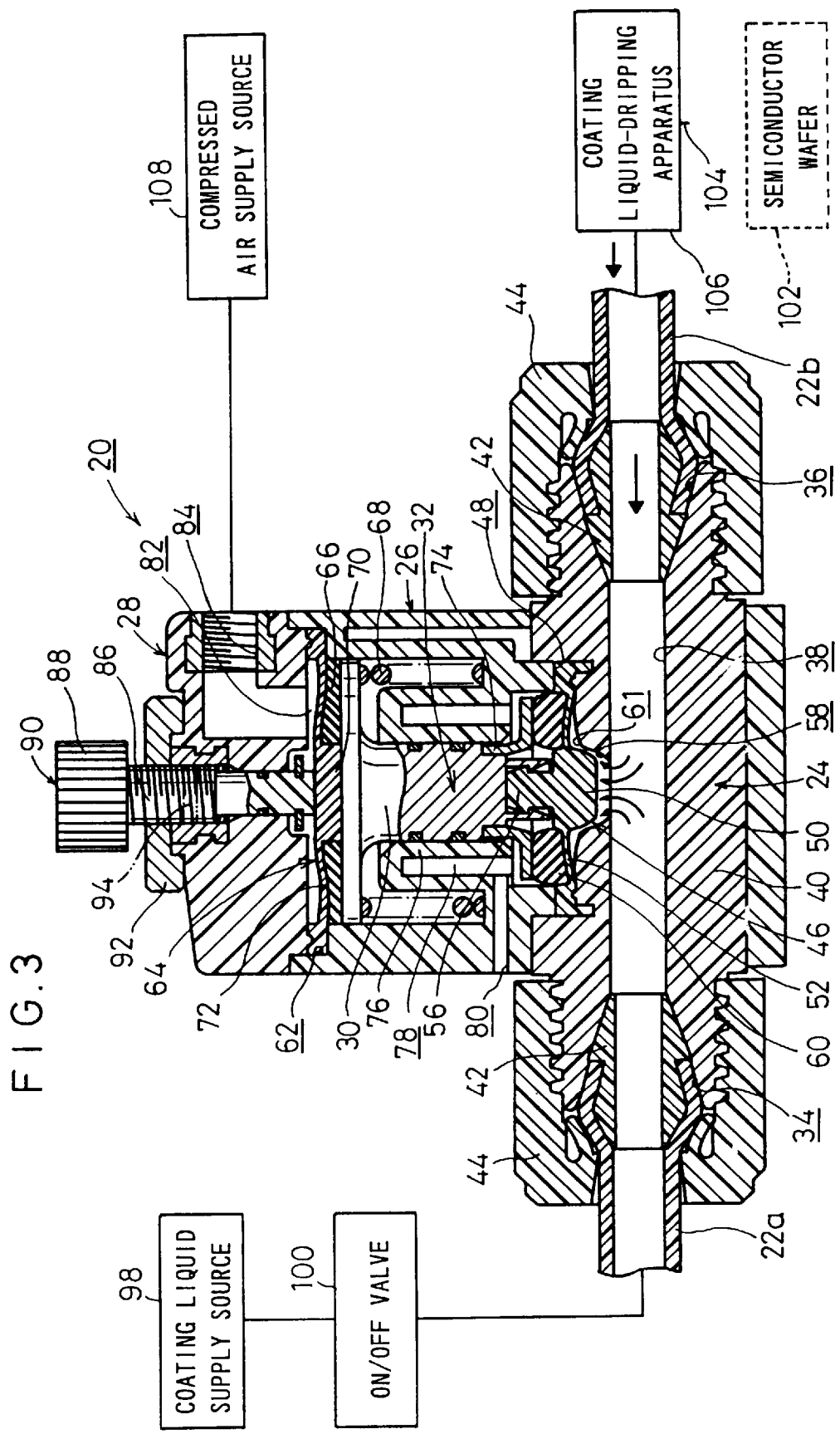

SUCK BACK VALVE HAVING DIAPHRAGM WITH THICK WALLED SECTION

BACKGROUND OF THE INVENTION

1. Field of the Invention

The present invention relates to a suck back valve which makes it possible, for example, to avoid liquid drip from a liquid supply port by sucking a predetermined amount of a fluid flowing through a fluid passage in accordance with a displacement action of a diaphragm.

2. Description of the Related Art

The suck back valve has been hitherto used, for example, in the production step for semiconductor wafers. The suck back valve has a function to prevent so-called liquid drip, i.e., a phenomenon in which a minute amount of coating liquid drips toward the semiconductor wafer from a supply port when the supply of the coating liquid to the semiconductor wafer is stopped.

A suck back valve concerning the conventional technique is shown in FIG. 5 (see, for example, Japanese Utility Model Publication No. 8-10399).

The suck back valve 1 includes a main valve body 5 formed with a fluid passage 4 for making communication between a fluid-introducing port 2 and a fluid-discharging port 3, and a bonnet 6 coupled to an upper portion of the main valve body 5. A diaphragm 7, which comprises a thick-walled section 7a and a thin-walled section 7b, is provided at a central portion of the fluid passage 4. The suck back valve 1 is formed such that the entire surface of the thick-walled section 7a and the thin-walled section 7b of the diaphragm 7 faces the fluid passage. The bonnet 6 is formed with a pressurized fluid supply port 8 which is connected to an unillustrated pressurized fluid supply source and to which a pressurized fluid is supplied in accordance with the changeover action of a directional control valve.

A piston 9 is fitted to the diaphragm 7. A v-packing 10, which is slidable on an inner wall surface of the main valve body 5 and which functions as a seal, is installed to the piston 9. A spring 11, which always presses the piston 9 upwardly, is provided in the main valve body 5. Reference numeral 12 indicates a screw member which abuts against the piston 9 to adjust the displacement amount of the piston 9 so that the flow amount of the fluid sucked by the diaphragm 7 is adjusted.

The outline of the operation of the suck back valve 1 will be explained. In an ordinary state in which the fluid is supplied from the fluid-introducing port 2 to the fluid-discharging port 3, the piston 9 and the diaphragm 7 are displaced downwardly in an integrated manner in accordance with the action of the pressurized fluid supplied from the pressurized fluid supply port 8. The diaphragm 7, which is coupled to the piston 9, protrudes over the fluid passage 4 as shown by two-dot chain lines in FIG. 5.

When the flow of the fluid through the fluid passage 4 is stopped, the piston 9 and the diaphragm 7 are raised in an integrated manner in accordance with the action of the repulsive force exerted by the spring 11, by stopping the supply of the pressurized fluid from the pressurized fluid supply port 8. A predetermined amount of the fluid, which remains in the fluid passage 4, is sucked in accordance with the action of the negative pressure produced by the diaphragm 7. Thus, the liquid drip, which would be otherwise caused at the fluid supply port, is prevented.

However, in the case of the suck back valve 1 concerning the conventional technique described above, the entire surface of the thick-walled section 7a and the thin-walled section 7b of the diaphragm 7 serves as a pressure-receiving surface for the fluid. Therefore, there is a likelihood that the diaphragm 7 is deformed due to the use over a long period of time, or any operation failure occurs due to occurrence of cracks or the like. As a result, an inconvenience arises in that the durability of the diaphragm 7 is deteriorated.

Further, the suck back valve 1 concerning the conventional technique involves the following inconvenience. That is, upon displacement of the piston 9, dispersion occurs in response speed when the state is changed from the fluid supply state to the fluid stop state or from the fluid stop state to the fluid supply state, due to the sliding resistance of the v-packing 10 which makes sliding displacement on the inner wall surface of the main valve body 5.

Moreover, the suck back valve 1 concerning the conventional technique involves the following inconvenience. That is, the screw member 12, which is screwed into the screw hole of the bonnet 6, is loosened, and the flow amount-setting position, at which the displacement of the piston 9 is restricted, is changed along with passage of time.

SUMMARY OF THE INVENTION

An general object of the present invention is to provide a suck back valve which makes it possible to improve the durability of a flexible member (diaphragm) for sucking, in accordance with a displacement action thereof, a predetermined amount of fluid flowing through a fluid passage.

A principal object of the present invention is to provide a suck back valve which makes it possible to obtain a substantially constant response speed of a flexible member when the mutual change is made between the fluid supply state and the supply stop state.

Another object of the present invention is to provide a suck back valve which makes it possible to avoid the change in flow amount-setting position, which would be otherwise caused by the change along with passage of time.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 explains the operation illustrating a state in which a first diaphragm is displaced from a state shown in FIG. 2.

DESCRIPTION OF THE PREFERRED EMBODIMENT

Figure 1:
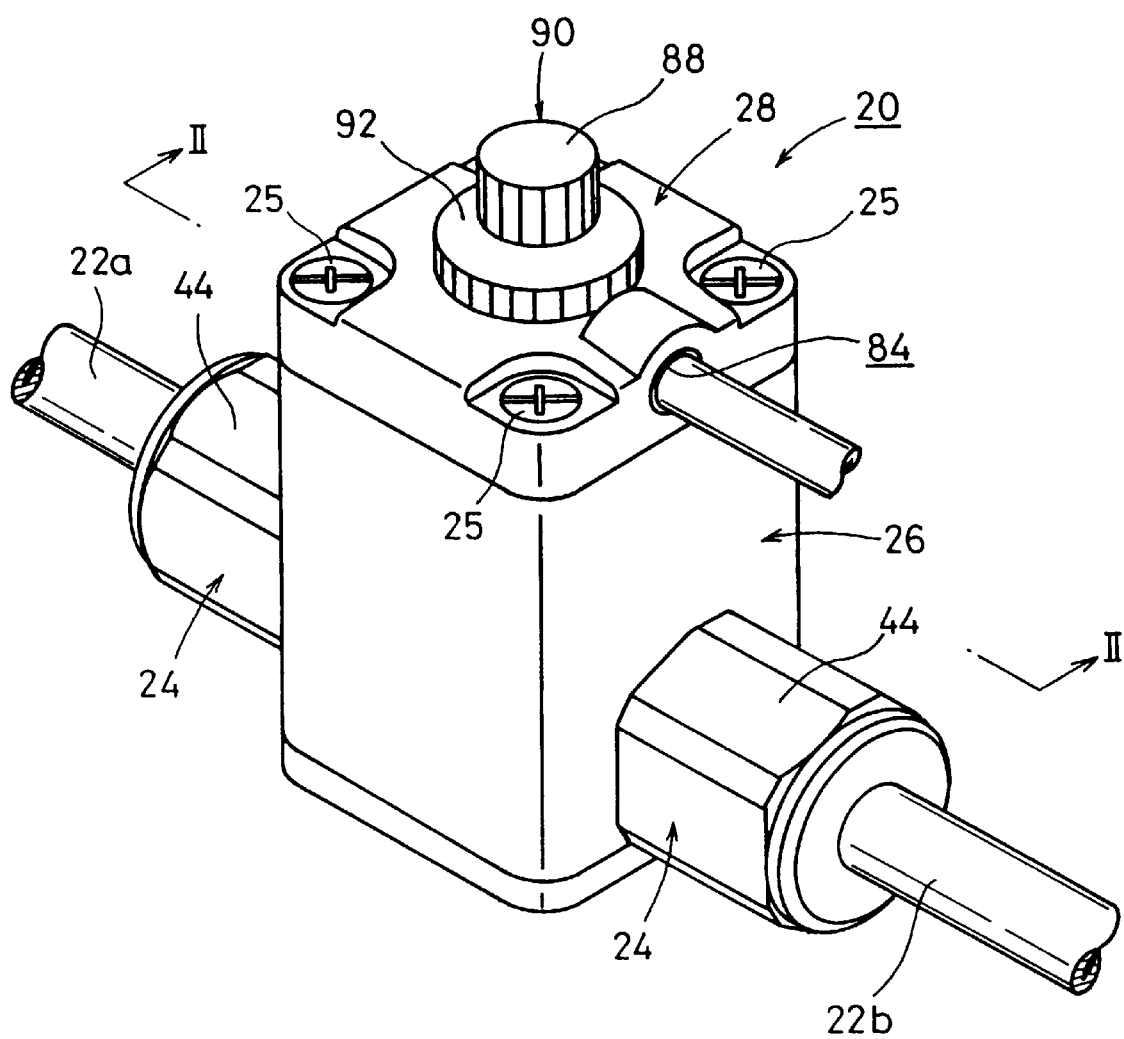
FIG. 1 shows a perspective view illustrating a suck back valve according to an embodiment of the present invention.
Figure 2:
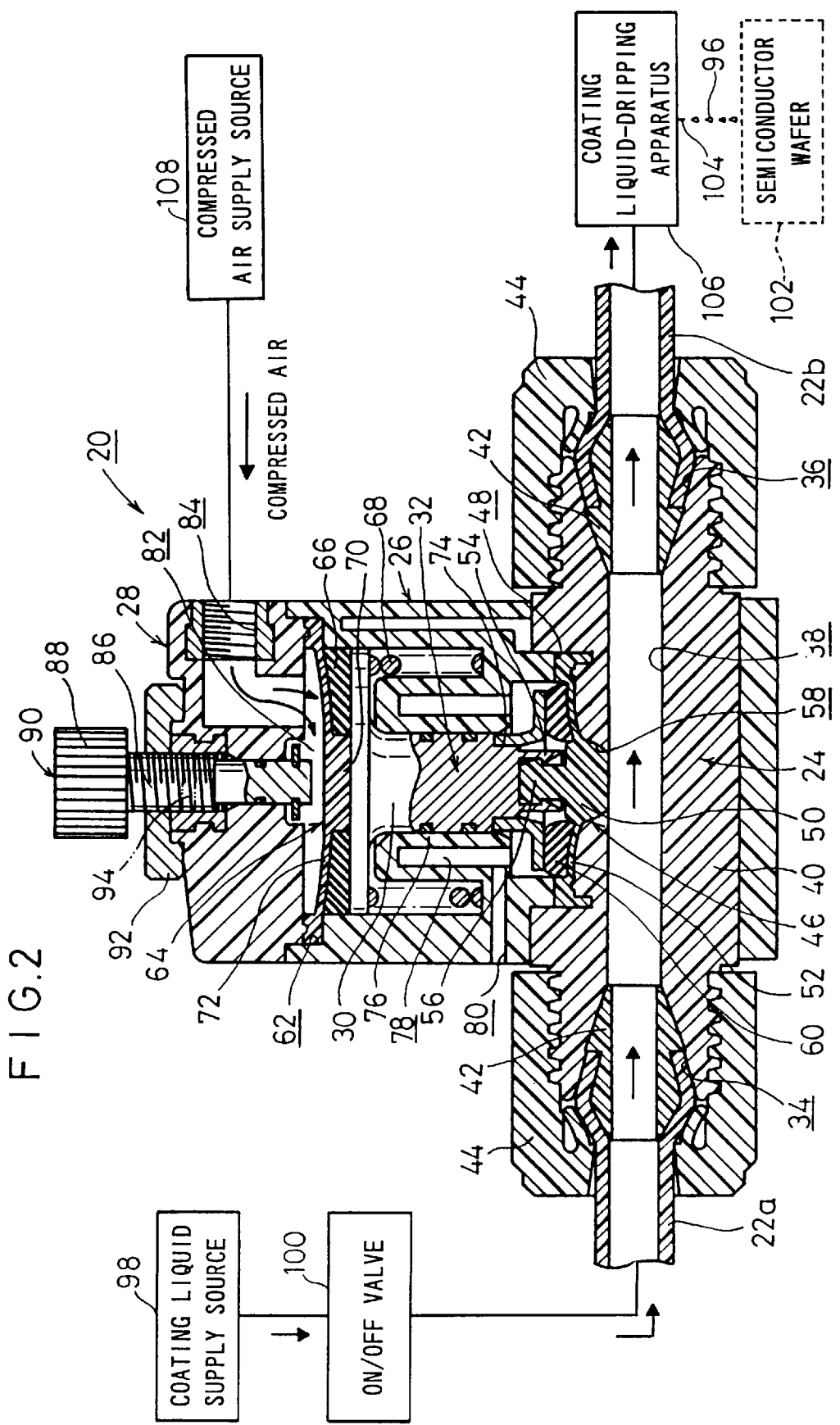
FIG. 2 shows a vertical cross-sectional view taken along a line II—II shown in FIG. 1.

In FIGS. 1 to 3, reference numeral 20 indicates a suck back valve according to an embodiment of the present invention.

As shown in FIG. 1, the suck back valve 20 comprises a joint section 24 for detachably connecting a pair of tubes 22a, 22b separated from each other by a predetermined spacing distance, a main valve body 26 which is provided in an integrated manner while surrounding the joint section 24, a cover member 28 which is coupled in an air-tight manner to an upper portion of the main valve body 26 by the aid of screw members 25, and a displacement mechanism 32 (see FIG. 2) including a piston 30 which makes sliding displacement along an inner wall surface of the main valve body 26. The joint section 24, the main valve body 26, and the cover member 28 function as a valve body.

As shown in FIG. 2, the joint section 24 comprises a cylindrical joint body 40 having a first port 34 formed at one end and a second port 36 formed at the other end and including a fluid passage 38 for making communication between the first port 34 and the second port 36, connecting members 42 for engaging with the first port 34 and the second port 36 respectively and being inserted into openings of tubes 22a (22b), and lock nuts 44 for being screwed into screw grooves threaded over end portions of the joint body 40 to retain air-tightness of portions to which the tubes 22a (22b) are connected.

A first diaphragm (flexible member) 46 is provided between the joint section 24 and the main valve body 26. The first diaphragm 46 is retained by a recess 48 formed at a coupling portion between the joint section 24 and the main valve body 26.

The first diaphragm 46 is constructed by a thick-walled section 50 formed at a central portion of its circular configuration, a thin-walled section 52 formed at an outer circumference of the thick-walled section 50, and a projection 56 protruding upwardly from the thick-walled section 50 and coupled to the piston 30 by the aid of a pawl 54. The thick-walled section 50 is formed to have a tapered configuration having its diameter which is gradually reduced toward the lower side.

A seat section 58 for seating the thick-walled section 50 of the first diaphragm 46 thereon is formed at a central portion of the joint section 24. The seat section 58 is constructed by a hole communicating with the fluid passage 38 and corresponding to the shape of the thick-walled section 50, the hole being formed to have a tapered configuration having its diameter which is gradually reduced toward the fluid passage 38. A ring-shaped resilient member 60, which is formed of, for example, a rubber material, is engaged with an upper surface portion of the thin-walled section 52 of the first diaphragm 46. In FIG. 3, reference numeral 61 indicates a gap formed when the thick-walled section 50 of the first diaphragm 46 is displaced upwardly and separated from the seat section 58.

The displacement mechanism 32 is provided at the inside of the main valve body 26. The displacement mechanism 32 includes a second diaphragm 64 retained in a recess 62 and interposed between the cover member 28 and the main valve body 26, the piston 30 which is slidably displaceable in the vertical direction along the inner wall surface of the main valve body 26 in accordance with the displacement action of the second diaphragm 64, a ring-shaped damper member 66 interposed between the second diaphragm 64 and the piston 30, and a spring member 68 fastened to a flange of the piston 30, for always pressing the piston 30 in the upward direction in accordance with the action of the repulsive force.

The second diaphragm 64 comprises a thick-walled section 70 formed at its central portion, and a thin-walled section 72 formed at an outer circumferential portion of the thick-walled section 70. The damper member 66 is installed in an annular recess formed on the bottom surface of the thin-walled section 72. A trumpet-shaped holding member 74, which has its diameter increasing vertically, is fixed at the lower end of the piston 30. The holding member 74 functions to engage with the upper surface of the resilient member 60 and hold the resilient member 60 for the thin-walled section 52 of the first diaphragm 46.

A first chamber 78 is formed at the inside of the main valve body 26 by the first diaphragm 46 and a bent section 76 which is bent to have an inverted U-shaped cross section. The first chamber 78 is formed to communicate with a port 80 via a passage. In this embodiment, when the first diaphragm 46 is displaced, the air in the first chamber 78 is supplemented from or discharged to the atmospheric air via the port 80.

A second chamber 82, which is closed by the second diaphragm 64 and the cover member 28, is provided between the main valve body 26 and the cover member 28. The second chamber 82 is formed to communicate with an air supply port (pressurized fluid-introducing port) 84.

A screw hole is formed at a central portion of the cover member 28. An adjusting screw member 90, which has a screw section 86 threaded over its outer circumferential surface and which has a knob 88 formed at one end, is screwed into the screw hole. The adjusting screw member 90 is fastened at a predetermined screwing position by the aid of a lock nut 92. The flow amount of a fluid (coating liquid), which is sucked by the first diaphragm 46 as described later on, can be adjusted by increasingly or decreasingly changing the screwing amount to adjust the position at which the other end of the adjusting screw member 90 abuts against the second diaphragm 64.

Figure 4A:
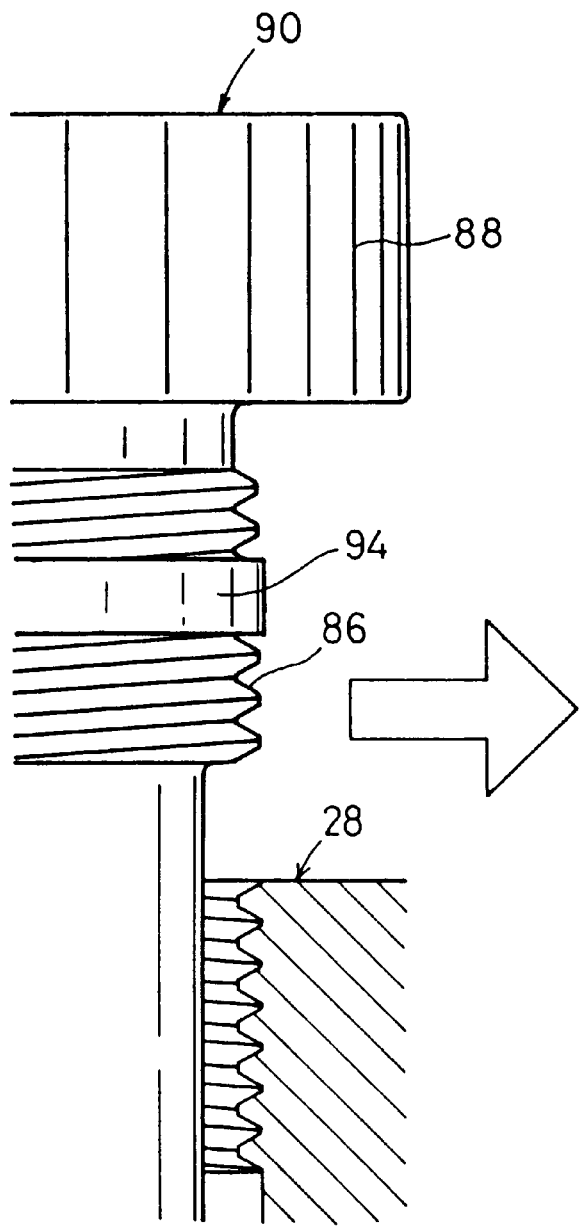
FIG. 4A shows a magnified partial cross-sectional view illustrating a state before an adjusting screw member is screwed along a screw groove.
Figure 4B:
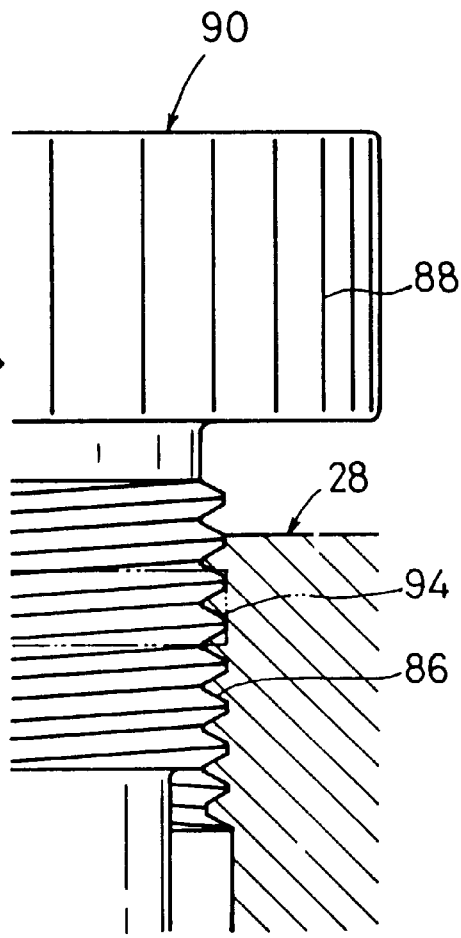
FIG. 4B shows a magnified partial cross-sectional view illustrating a state in which a screw thread has been threaded over a fastening member by screwing the adjusting screw member.

A fastening member 94, which is constructed by a ring composed of a resin material, is fitted to the screw section 86 of the adjusting screw member 90. As shown in FIG. 4A, the outer circumferential section of the fastening member 94 exposed to the screw section 86 is formed to have a linear cross section, on which no screw thread is formed beforehand. A screw thread is newly formed on the outer circumferential section of the fastening member 94 by screwing the adjusting screw member 90 along the screw hole of the cover member 28 (see FIG. 4B).

As a result, the adjusting screw member 90 screwed into the screw hole of the cover member 28 is prevented from being loosened owing to the fastening action cooperatively effected by the lock nut 92 and the fastening member 94. Thus, it is possible to avoid any change along with passage of time, of the flow amount-setting position for restricting th e displacement of the piston 30.

The suck back valve 20 according to the embodiment of the present invention is basically constructed as described above. Next, its operation, function, and effect will be explained.

As shown in FIG. 2, on one hand, a coating liquid supply source 98 in which a coating liquid 96 is stored, and an ON /OFF valve 100 for controlling the supply amount of the coating liquid 96 are connected to the tube 22a which communicates with the first port 34 of the suck back valve 20. On the other hand, a coating liquid-dripping apparatus 106, which is provided with a nozzle 104 for dripping the coating liquid 96 to the semiconductor wafer 102, is connected to the tube 22b which communicates with the second port 36. A compressed air supply source 108 is connected beforehand to the air supply port 84 of the cover member 28.

After performing the preparatory operations as described above, the compressed air supply source 108 is operated to introduce compressed air into the second chamber 82 via the air supply port 84 (see arrows shown in FIG. 2). When the pressing force of the compressed air introduced into the second chamber 82 overcomes the repulsive force of the spring member 68, then the second diaphragm 64, the damper member 66, and the piston 30 are displaced downwardly in an integrated manner, and the second diaphragm 64 is separated from one end of the adjusting screw member 90. In accordance with the downward displacement of the second diaphragm 64, the piston 30 and the thick-walled section 50 of the first diaphragm 46 are displaced downwardly in an integrated manner. As a result, as shown in FIG. 2, a state is given, in which the thick-walled section 50 of the first diaphragm 46 is seated on the seat section 58. Thus, the coating liquid 96 is excluded from invasion between the thick-walled section 50 and the seat section 58.

In a state in which the first diaphragm 46 is seated on the seat section 58, the coating liquid supply source 98 and the ON/OFF valve 100 are operated to allow the coating liquid 96 to flow along the fluid passage 38. The coating liquid 96 is dripped to the semiconductor wafer 102 by the aid of the coating liquid-dripping apparatus 106. As a result, a coating film (not shown) having a desired film thickness is formed on the semiconductor wafer 102.

After a predetermined amount of the coating liquid 96 is applied to the semiconductor wafer 102 by the aid of the coating liquid-dripping apparatus 106, the ON/OFF valve 100 is de-energized to stop the flow of the coating liquid 96. Therefore, a dripping-stop state is given for the coating liquid 96, concerning dripping from the nozzle 104 of the coating liquid-dripping apparatus 106 to the semiconductor wafer 102. In this situation, the coating liquid 96 just before being dripped to the semiconductor wafer 102 remains in the nozzle 104 of the coating liquid-dripping apparatus 106. Therefore, there is a likelihood that liquid drip may occur.

Accordingly, when the supply of compressed air to the air supply port 84 is stopped in accordance with the action of an unillustrated directional control valve, the piston 30, the damper member 66, and the second diaphragm 64 are raised in an integrated manner in accordance with the action of the repulsive force exerted by the spring member 68. Therefore, the thick-walled section 50 of the first diaphragm 46 coupled to the lower end of the piston 30 is displaced upwardly, and the thick-walled section 50 is separated from the seat section 58. Thus, the gap 61 (see FIG. 3) is formed. During this process, the action of negative pressure is generated in accordance with the displacement of the first diaphragm 46, and a predetermined amount of the coating liquid 96 in the fluid passage 38 is sucked along a direction indicated by arrows toward the inside of the gap 61 formed between the thick-walled section 50 and the seat section 58 (see FIG. 3). As a result, the predetermined amount of the coating liquid 96, which remains in the nozzle 104 of the coating liquid-dripping apparatus 106, is returned toward the suck back valve 20 (in the direction indicated by arrows). Thus, it is possible to avoid liquid drip to the semiconductor wafer 102.

When the ON/OFF valve 100 is operated again, and the pressurized fluid is introduced from the air supply port 84, then the first diaphragm 46 is lowered to give the state shown in FIG. 2. Thus, the dripping of the coating liquid 96 to the semiconductor wafer 102 is started. When the first diaphragm 46 is lowered to be seated on the seat section 58, the first diaphragm 46 is pressed downwardly in accordance with the resilient action of the resilient member 60. Thus, the coating liquid 96, which has entered the gap 61 between the thick-walled section 50 and the seat section 58, can be discharged toward the fluid passage 38. As a result, it is possible to smoothly and quickly perform seating or separation of the first diaphragm 46 with respect to the seat section 58.

In the embodiment according to the present invention, the suck back valve 20 is constructed such that when the coating liquid 96 flows along the fluid passage 38, the state is given, in which the thick-walled section 50 of the first diaphragm 46 is seated on the seat section 58, and only the bottom surface of the thick-walled section 50 is exposed to the fluid passage 38 (see FIG. 2).

Figure 5:
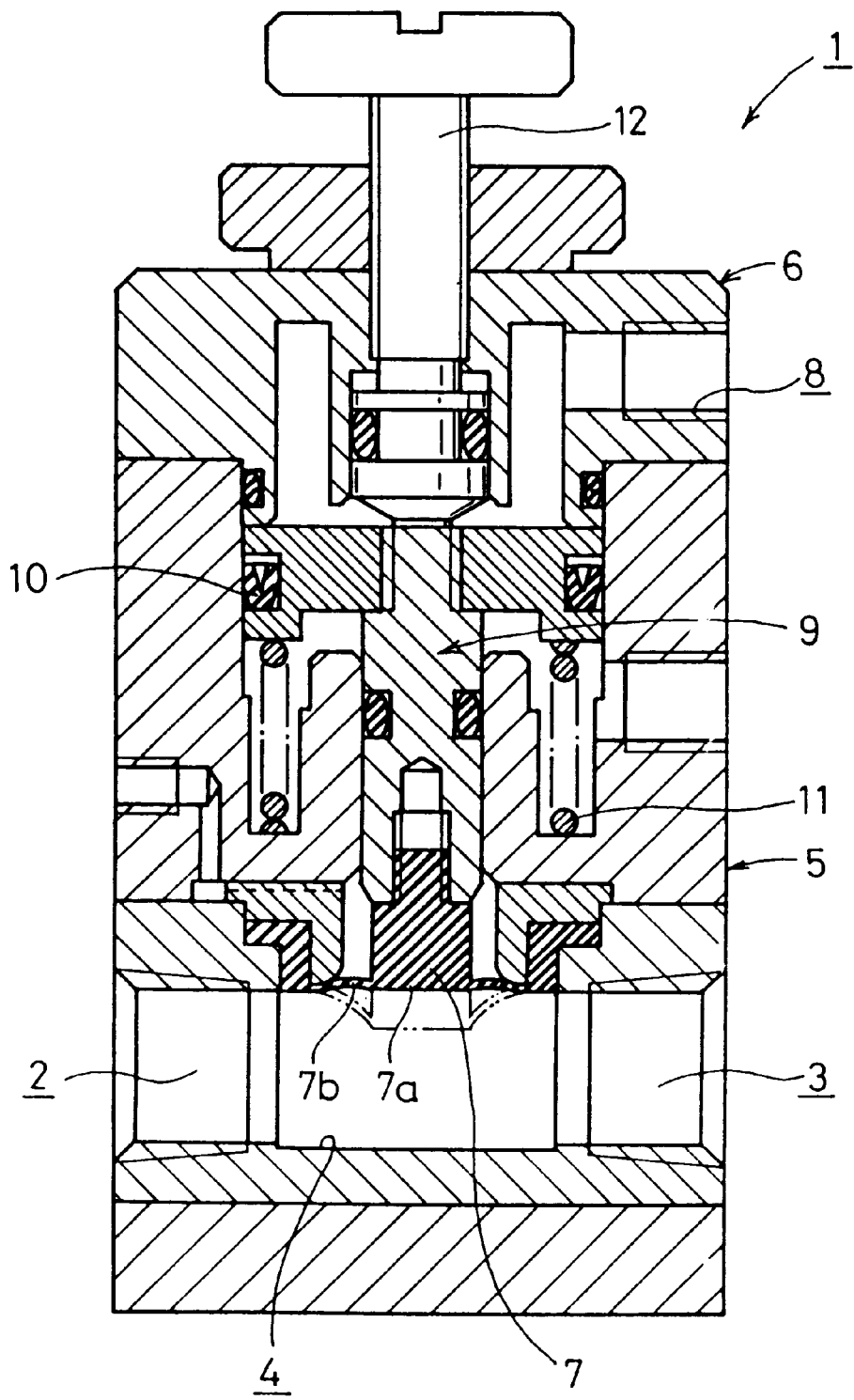
FIG. 5 shows a vertical cross-sectional view illustrating the suck back valve concerning the conventional technique.

Therefore, in the embodiment according to the present invention, only the bottom surface of the thick-walled section 50 of the first diaphragm 46 serves as a pressure-receiving surface, and it is possible to decrease the pressure-receiving area, as compared with the conventional technique (see FIG. 5) in which the entire surface of the thick-walled section 7a and the thin-walled section 7b of the diaphragm valve 7 serves as a pressure-receiving surface. Therefore, it is possible to prevent the first diaphragm 46 from deformation or occurrence of crack or the like due to the use over a long period of time. As a result, it is possible to improve the durability of the first diaphragm 46.

The embodiment of the present invention adopts the arrangement in which the second diaphragm 64, which makes displacement in accordance with the action of the compressed air introduced from the air supply port 84, is provided, and the piston 30 is raised or lowered in accordance with the displacement action of the second diaphragm 64. Therefore, in the embodiment of the present invention, it is unnecessary to provide any v-packing 10 having the sliding resistance as in the conventional technique. Accordingly, it is possible to avoid occurrence of dispersion in response speed, which would be otherwise caused when the supply state and the stop state for the coating liquid 96 is mutually changed.

Further, in the embodiment of the present invention, the adjusting screw member 90 is provided with the fastening member 94 on which the screw thread is threaded by screwing the fastening member 94 along the screw hole of the cover member 28, and the adjusting screw member 90 is prevented from being loosened, in accordance with the fastening action cooperatively effected by the lock nut 92 and the fastening member 94. As a result, the screwing position for the adjusting screw member 90 is reliably retained, and it is possible to avoid any change along with passage of time, of the flow amount-setting position for restricting the displacement of the piston 30.

Moreover, in the embodiment of the present invention, the damper member 66 is provided between the second diaphragm 64 and the piston 30. Thus, the shock to be given to the piston 30 is mitigated, and the first diaphragm 46 is prevented from transfer of shock. As a result, the service life of the first diaphragm 46 can be remarkably improved.

What is claimed is:

1. A suck back valve comprising:

a valve body including a fluid passage having a first port formed at one end and a second port formed at the other end, and a pressurized fluid-introducing port for introducing a pressurized fluid;

a displacement mechanism provided displaceably at the inside of said valve body, for making displacement in accordance with an action of said pressurized fluid introduced from said pressurized fluid-introducing port;

a flexible member coupled to said displacement mechanism, for making displacement integrally with said displacement mechanism; and a seat section provided to face to said fluid passage of said valve body, for seating said flexible member or making separation from said flexible member; and wherein said flexible member comprises a first diaphragm including a thick-walled section and a thin-walled section, and only a bottom surface of said thick-walled section which faces said fluid passage serves as a pressure-receiving surface for a fluid flowing through said fluid passage when said first diaphragm is seated on said seat section, and said first diaphragm is separated from said seat section in accordance with a displacement action of said displacement mechanism to form a predetermined gap so that a predetermined amount of said fluid in said fluid passage is sucked into said gap by a negative pressure, wherein said seat section comprises a hole having a cross-sectional configuration corresponding to an outer configuration of said thick-walled section such that said thick-walled section of said first diaphragm can be fitted into said hole so that said bottom surface is substantially flush with said fluid passage.

2. The suck back valve according to claim 1, wherein said seat section is composed of a hole having a tapered cross-sectional configuration, and said thick-walled section of said first diaphragm is formed to have its diameter which is gradually reduced toward said bottom surface so as to correspond to said-tapered configuration of said hole.

3. The suck back valve according to claim 1, wherein said displacement mechanism comprises a second diaphragm (64) which is displaceable in accordance with an action of said pressurized fluid introduced from said pressurized fluid-introducing port, a piston provided displaceably in said main valve body, for making displacement integrally with said second diaphragm, and a spring member for urging said piston in a predetermined direction.

4. The suck back valve according to claim 3, wherein a resilient member for contacting with said thin-walled section of said first diaphragm to protect said thin-walled section is interposed between said piston and said first diaphragm coupled to one end of said piston.

5. The suck back valve according to claim 3, wherein a damper member for damping a load applied to said second diaphragm is provided between said second diaphragm and said piston.

6. The suck back valve according to claim 1, wherein a cover member, which is displaced on an upper portion of said valve body, is provided with an adjusting screw member for adjusting a flow amount of said fluid sucked by said first diaphragm, by restricting a displacement amount of said first diaphragm, and said adjusting screw member is provided with a fastening member over which a screw thread is newly threaded by screwing said fastening member along a screw hole of said cover member.

7. The suck back valve according to claim 1, wherein said suck back valve is disposed between a coating liquid supply source for supplying a coating liquid for coating a semiconductor wafer therewith and a coating liquid-dripping apparatus for coating said semiconductor wafer with said coating liquid by the aid of a nozzle, and the suck back valve sucks said coating liquid remaining in said nozzle of said coating liquid-dripping apparatus when supply of said coating liquid from said coating liquid supply source is stopped.

8. A suck back valve comprising:

a valve body including a fluid passage having a first port formed at one end and a second port formed at the other end, and a pressurized fluid-introducing port for introducing a pressurized fluid;

a displacement mechanism provided displaceably at the inside of said valve body, for making displacement in accordance with an action of said pressurized fluid introduced from said pressurized fluid-introducing port;

a flexible member coupled to said displacement mechanism, for making displacement integrally with said displacement mechanism;

a seat section provided to face to said fluid passage of said valve body, for seating said flexible member or making separation from said flexible member; and a cover member disposed on an upper portion of said valve body and provided with an adjusting screw member for adjusting a fluid amount of said fluid sucked by said first diaphragm, by restricting a displacement amount of said first diaphragm, said adjusting screw member being provided with a fastening member over which a screw thread is newly threaded by screwing said fastening member along a screw hole of said cover member, wherein said flexible member comprises a first diaphragm including a thick-walled section and a thin-walled section, and only a bottom surface of said thick-walled section which faces said fluid passage serves as a pressure-receiving surface for a fluid flowing through said fluid passage when said first diaphragm is seated on said seat section, and said first diaphragm is separated from said seat section in accordance with a displacement action of said displacement mechanism to form a predetermined gap so that a predetermined amount of said fluid in said fluid passage is sucked into said gap by a negative pressure.

9. A suck back valve comprising:

a valve body including a fluid passage having a first port formed at one end and a second port formed at the other end, and a pressurized fluid-introducing port for introducing a pressurized fluid;

a displacement mechanism provided displaceably at the inside of said valve body, for making displacement in accordance with an action of said pressurized fluid introduced from said pressurized fluid-introducing port;

a flexible member coupled to said displacement mechanism, for making displacement integrally with said displacement mechanism, wherein said flexible member comprises a first diaphragm including a thick-walled section and a thin-walled section, and only a bottom surface of said thick-walled section which faces said fluid passage serves as a pressure receiving surface for a fluid flowing through said fluid passage when said first diaphragm is seated on said seat section, and said first diaphragm is separated from said seat section in accordance with a displacement action of said displacement mechanism to form a predetermined gap so that a predetermined amount of said fluid in said fluid passage is sucked into said gap by a negative pressure; and a seat section provided to face to said fluid passage of said valve body, for seating said flexible member or making separation from said flexible member, wherein said displacement member comprises a second diaphragm which is displaceable by a pressurized fluid introduced from said pressurized fluid-introducing port, a piston displaceably disposed in said main valve body for displacement integrally with said second diaphragm, and a spring member for urging said piston in a predetermined direction, and wherein a resilient member for contacting said thin-walled section of said first diaphragm to protect said thin-walled section is interposed between said piston and said first diaphragm coupled to one end of said piston.

10. A suck back valve comprising:

a valve body including a fluid passage having a first port formed at one end and a second port formed at the other end, and a pressurized fluid-introducing port for introducing a pressurized fluid;

a displacement mechanism provided displaceably at the inside of said valve body, for making displacement in accordance with an action of said pressurized fluid introduced from said pressurized fluid-introducing port;

a flexible member coupled to said displacement mechanism, for making displacement integrally with said displacement mechanism, wherein said flexible member comprises a first diaphragm including a thick-walled section and a thin-walled section, and only a bottom surface of said thick-walled section which faces said fluid passage serves as a pressure receiving surface for a fluid flowing through said fluid passage when said first diaphragm is seated on said seat section, and said first diaphragm is separated from said seat section in accordance with a displacement action of said displacement mechanism to form a predetermined gap so that a predetermined amount of said fluid in said fluid passage is sucked into said gap by a negative pressure; and a seat section provided to face to said fluid passage of said valve body, for seating said flexible member or making separation from said flexible member, wherein said displacement member comprises a second diaphragm which is displaceable by a pressurized fluid introduced from said pressurized fluid-introducing port, a piston displaceably disposed in said main valve body for displacement integrally with said second diaphragm, and a spring member for urging said piston in a predetermined direction, and wherein a damper member for damping a load applied to said second diaphragm is provided between said second diaphragm and said piston.

* * * * *